Jan. 25, 1927.  
E. PROCHASKA  
1,615,403  
TWO-WHEELED VEHICLE  
Filed Nov. 16, 1925   2 Sheets-Sheet 1

Emil Prochaska, Inventor

Witnesses
C. E. Churchman Jr

By Richard B. Owen
Attorney

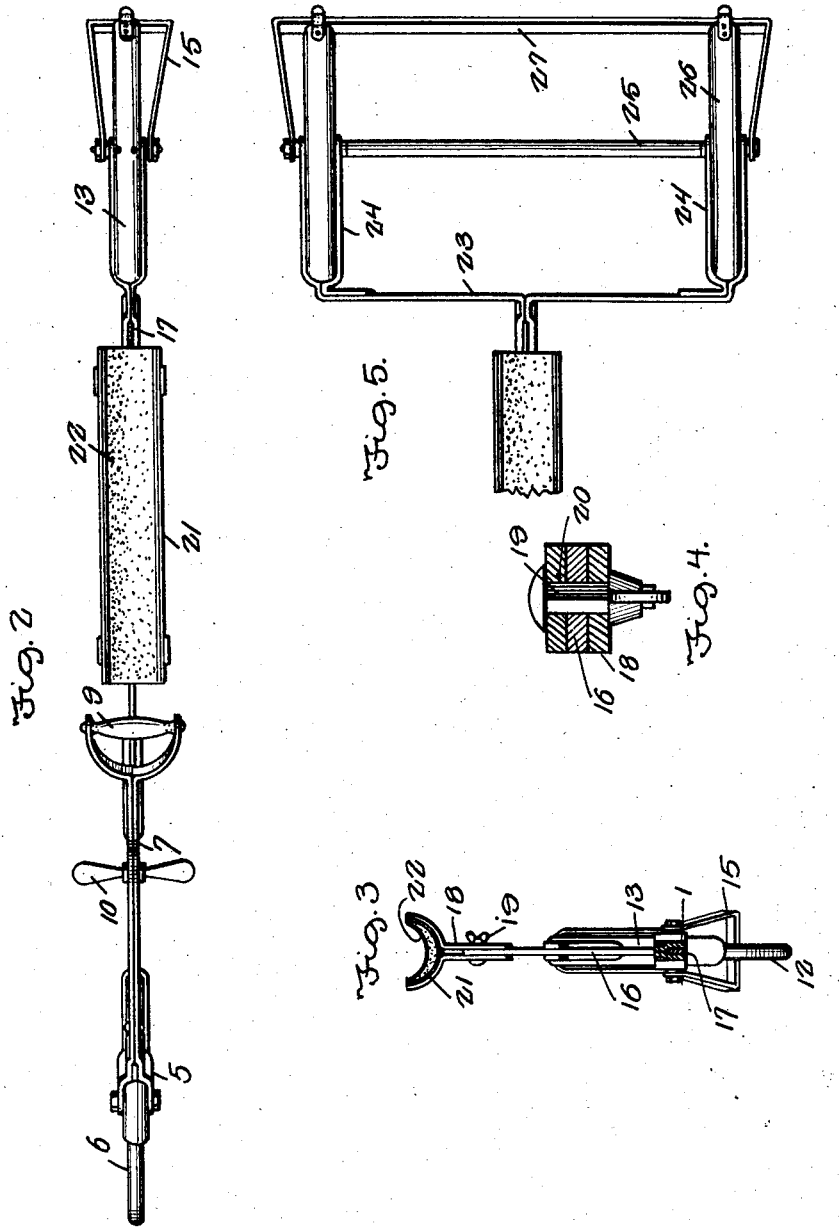

Patented Jan. 25, 1927.

1,615,403

UNITED STATES PATENT OFFICE.

EMIL PROCHASKA, OF CATAWBA, WISCONSIN.

TWO-WHEELED VEHICLE.

Application filed November 16, 1925. Serial No. 69,496.

This invention relates to a toy wheeled vehicle and has for its object the production of a simple and efficient vehicle which is very simply constructed and which may be manufactured at a reasonable cost and which may be operated by a child with great facility.

Another object of this invention is the production of a simple and efficient means for supporting the knee or leg of the child while the child propels the vehicle with the other foot or leg, in order to use the device as a coaster.

With these and other objects in view, this invention consists of certain novel constructions, combinations and arrangements of parts as will be hereinafter fully described and claimed.

In the drawings:

Figure 2 is a top plan view of the structure shown in Figure 1.

Figure 3 is a vertical sectional view taken on line 3—3 of Figure 1.

Figure 4 is an enlarged transverse sectional view taken on line 4—4 of Figure 1.

Figure 5 is a top plan view of the rear end of a modified form of the invention, wherein two wheels are employed upon the rear end of the vehicle for producing a three wheeled vehicle. This change may be made without departing from the spirit of the invention.

Figure 1:
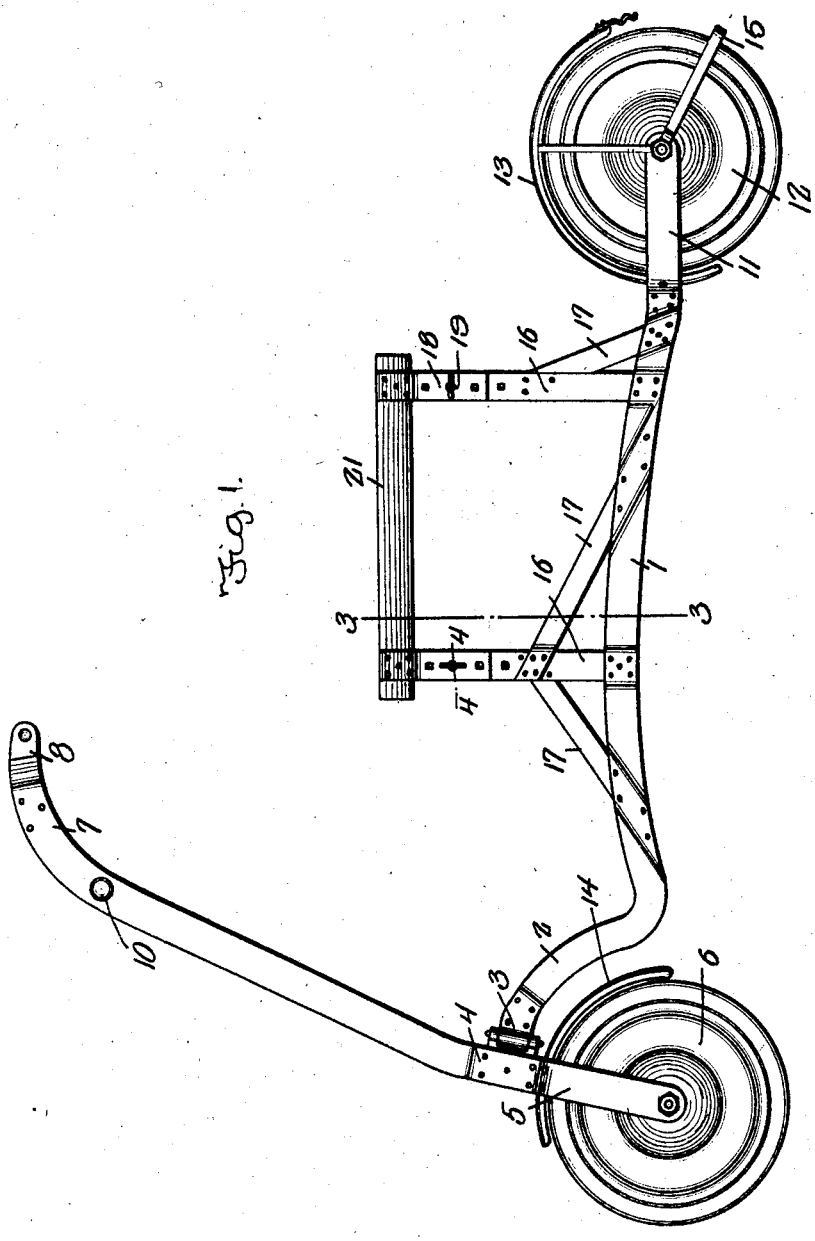
Figure 1 is a side elevation of the toy coaster or wheeled vehicle.

By referring particularly to the drawings, it will be seen that 1 designates the main frame which comprises a pair of longitudinally extending strap bars having an upturned forward end 2, which is hingedly connected at 3 to the steering bar 4. This steering bar 4 may be formed of any suitable or desired structure and is provided with a suitable forked lower end 5 for the purpose of supporting the forward disc wheel 6. The steering bar 4 is provided with a rearwardly curved upper end 7, which is terminated in a substantially forked portion 8 carrying between its spaced ends a grip portion 9. A suitable laterally extending grip handle 10 may be also supported upon the steering bar 4 slightly below the grip handle 9 upon either side of the bar if it is so desired for the purpose of constituting a handle hold for the operator, one hand being engaged upon the grip and the other hand being engaged upon one of the handles 10. The device may therefore be very easily and conveniently steered by the operator through the convenient grip portions 9 and 10 which are carried by the steering bar 4.

The frame 1 carries a suitable support 11 at its rear end for the purpose of supporting the rear wheel 12 of suitable design or structure. A suitable mud guard 13 is employed and supported upon the frame over the rear wheel 12 and a suitable mud guard 14 is also supported over the front wheel 6 as clearly illustrated in Figure 1. A parking stand 15 is also hingedly secured to the rear end of the frame 1 as clearly illustrated in Figure 1 and this parking stand 15 may be made of the usual or desired form. It should also be understood that any suitable or desired type of wheel may be employed, although the present type which has been illustrated, and which has been found convenient and desirable consists of the ordinary disc wheel having a suitable rubber tire mounted thereon as is clearly illustrated in the drawings.

A stand is supported upon the frame 1 and comprises a plurality of vertically extending bars 16 which are braced by means of suitable braces 17, clearly illustrated in the drawing. These vertically extending bars 16 carry vertically adjustable cradle plates 18, which cradle plates are held in a set or adjusted position by means of the adjusting screws 19 clearly illustrated in Figures 1 and 4 of the drawings. These locking bolts 19 are squared in cross section at their shank portions and fit within suitable squared apertures 20 formed in the respective vertically extending bars 16 and the cradle plates 18 so as to hold these cradle plates 18 in a proper vertically extended position against swinging movement.

An elongated channel plate 21 is carried by the cradle plates 18 and constitutes a knee rest, the knee rest being lined with suitable padding, as indicated at 22.

In Figure 5, I have shown a modified form of the invention wherein the rear end of the frame is provided with laterally extending arms 23 which arms terminate in rearwardly extending forks 24 for engaging the respective ends of the rear axle 25, the rear axle 25 supporting suitable wheels 26. A suitable parking stand 27 is also employed and carried by the rear axle, 25, as clearly illustrated in Figure 5 for use in connection with the three wheeled type of the vehicle should it be so desired, for the purpose of relieving pressure from the tires when the device is not in use.

It should be understood that certain detailed changes in mechanical construction can be employed in the present invention without departing from the spirit thereof, so long as these changes fall within the scope of the appended claims.

Having described the invention, what is claimed is:

1. A vehicle of the class described including a frame, supporting wheels, and a steering bar, said frame provided with a plurality of vertically extending knee rest supporting members, said knee rest supporting members carrying a longitudinally extending channel member constituting a knee rest, and a pad positioned within said knee rest.

2. A vehicle of the class described including a frame, supporting wheels, and a steering bar, a stand carried by the frame, a longitudinally extending channel member carried by the stand, a longitudinally extending pad fitted within the channel member and constituting a knee rest for receiving the knee and leg of an operator.

3. A vehicle of the class described, comprising a frame, a steering bar for the frame, a stand comprising a plurality of vertically extending members, cradle plates adjustably mounted upon the upper ends of said vertically extending members, means for locking said cradle plates in an adjusted position upon the upper end of said vertically extending members, a longitudinally extending channel member carried by said cradle plates, a pad fitted within the channel member constituting a leg and knee rest, and supporting wheels for the frame.

In testimony whereof I affix my signature.

EMIL PROCHASKA.